United States Patent [19]
Yamazaki et al.

[11] 4,217,044
[45] Aug. 12, 1980

[54] INDICATING DEVICES FOR CAMERA VIEWFINDERS

[75] Inventors: Keiji Yamazaki, Sakai; Takeshi Egawa, Sennan; Yasuo Yamazaki, Kawachinagano; Hiroshi Ueda, Nara, all of Japan

[73] Assignee: Minolta Camera Kabushiki Kaisha, Osaka, Japan

[21] Appl. No.: 851,975

[22] Filed: Nov. 16, 1977

[30] Foreign Application Priority Data

Nov. 24, 1976 [JP] Japan .................. 51-141572
Nov. 26, 1976 [JP] Japan .................. 51-142433

[51] Int. Cl.³ .......................... G03B 17/20
[52] U.S. Cl. .................. 354/54; 354/60 L; 354/224; 354/289
[58] Field of Search ......... 354/23 R, 36, 38, 53–55, 354/60 I, 60 L, 28, 29, 219, 224, 225, 289; 352/171; 40/546; 340/380

[56] References Cited

U.S. PATENT DOCUMENTS

| | | | |
|---|---|---|---|
| 3,829,867 | 8/1974 | Ono | 354/29 X |
| 3,836,922 | 9/1974 | Hasegawa et al. | 354/51 |
| 3,982,254 | 9/1976 | Ito et al. | 354/53 |
| 3,990,799 | 11/1976 | Nanba et al. | 354/54 X |
| 4,047,189 | 9/1977 | Bletz et al. | 354/53 X |

FOREIGN PATENT DOCUMENTS

2544330  4/1976 Fed. Rep. of Germany ............ 354/53

*Primary Examiner*—L. T. Hix
*Assistant Examiner*—William B. Perkey
*Attorney, Agent, or Firm*—Watson, Cole, Grindle & Watson

[57] ABSTRACT

An indicating device for a camera, which includes a viewfinder and which is selectively settable to either an automatic diaphragm control mode or an automatic shutter speed control mode, enables selective observation of the f-number and the shutter speed scales in accordance with the selection of the exposure control modes. The f-number and shutter speed scales are provided on a common transparent scale plate which is interconnected with an exposure control mode selecting member by a scale shifting mechanism. The scale shifting mechanism shifts the scale plate to a first position wherein only the f-number scale is in the viewfinder optical path upon selection of the automatic diaphragm control mode, and to a second position wherein both the f-number scale and the shutter speed scale are in the viewfinder optical path. A scale shielding member is provided within the viewfinder optical path to shield the f-number scale when the scale plate is in the second position.

10 Claims, 11 Drawing Figures

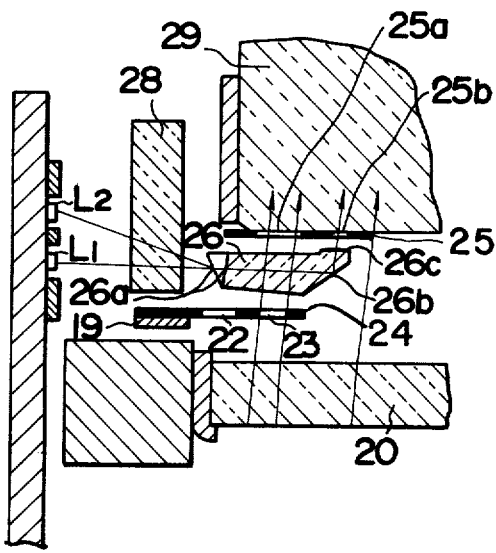
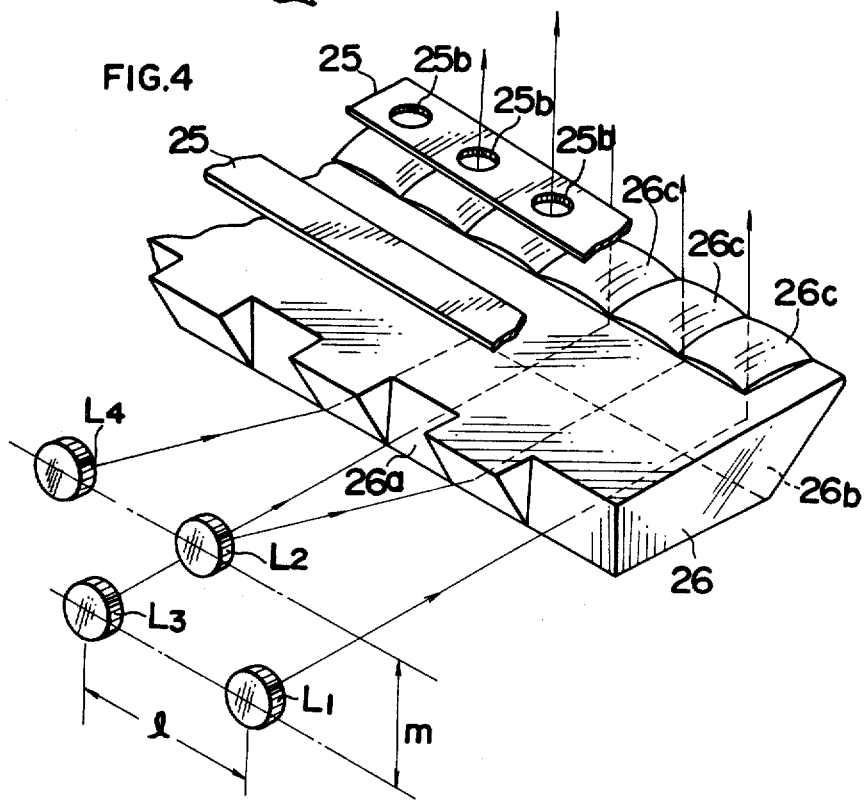

INDICATING DEVICES FOR CAMERA VIEWFINDERS

BACKGROUND OF THE INVENTION

1. Field of the Invention

This invention relates to viewfinder indicating devices for cameras, for indicating shutter speed to provide proper exposure in accordance with the intensity of light from an object, the set film sensitivity, a preset f-number, or for indicating an f-number for providing a proper exposure in accordance with the intensity of the light, the set film sensitivity and a preselected shutter speed.

2. Prior Art

Prior art automatic exposure controls for cameras adopt either a diaphragm-priority, automatic shutter speed control system or a shutter-speed-priority, automatic diaphragm control system. In the former type, a shutter speed to be automatically controlled is indicated, and in the latter type, an f-number to be automatically controlled is indicated. Whether the f-number or the shutter speed is set by priority is largely dependent on the photographing conditions or the operator's will. A demand therefore arises for the capability of setting an f-number by priority as well as setting a shutter speed by priority in a single camera.

To meet the above demand, in designing a viewfinder indicating device for a camera which is capable of setting the f-number and setting the shutter speed by priority, the ordinary mechanism provides a shutter speed scale and a separate f-number scale which can be seen within a viewfinder; an indicating means operable according to a preset f-number and the value of light measured; and an indicating means operable according to a preset shutter speed and the value of light measured. The latter two means are disposed in opposing relation to the shutter speed scale and f-number scale, respectively. Arrangements employing such a dual indicating means result in increased manufacturing cost and increased space for mounting such means. Furthermore, the provision of the shutter speed scale and the f-number scale which may be simultaneously seen within the viewfinder causes the operator to be momentarily confused in judging which one of the scales is to be read.

The viewfinder indicating device desclosed in U.S. Pat. No. 3,829,867 attempts to solve the problems described, and is applied to an automatic exposure control, T.T.L. light measuring single lens reflex camera, wherein two exposure modes, such as shutter-speed priority, automatic diaphragm control and diaphragm priority, automatic shutter speed control, are alternatively selectable. The viewfinder indicating device disclosed in the aforesaid patent is so arranged that a first indicating member having a shutter speed scale thereon and a second indicating member having an f-number scale thereon are shifted in opposite directions in accordance with the selected control mode. Thus, when automatic shutter speed control is selected, only the shutter speed scale is within the viewfinder optical path. Conversely, when automatic f-number control is selected, only the f-number scale is within the viewfinder optical path. Also, only a single meter is used as a means for indicating both the shutter speed and the f-number. With such an indicating device, a meter used as an indicating means is susceptible to vibration, and the provision of two indicating members for the shutter speed scale and for the f-number scale, respectively, requires a complex mechanism to shift the indicating members. Furthermore, irrespective of whether the signal to the meter is an f-number signal or a shutter speed signal, the signal to oscillate the meter pointer to a given degree must be maintained constant. For this reason, the f-number scale and the shutter speed scale must be maintained in a constant positional relationship. To this end, adjustment of the positional relationship between these two indicating members is unavoidable upon assembly.

SUMMARY OF THE INVENTION

It is accordingly an object of the present invention to provide viewfinder indicating devices for cameras, wherein a shutter speed scale and an f-number scale are provided on a single indicating plate, and a group of optical indicating elements, such as light-emitting diodes, are used as means for indicating the shutter speed and f-number, thereby eliminating the drawbacks encountered with the indicating device disclosed in U.S. Pat. No. 3,829,867. Further, the provision of the f-number scale and shutter speed scale on the indicating plate is improved, so that a desired scale alone appears within the viewfinder, with the unwanted scale kept away from the range of the viewfinder, so that the operator can readily read the shutter speed or f-number, without turning his eyes away from the viewfinder.

An embodiment of the present invention attains the above objects with a group of optical indicating elements disposed outside the viewfinder optical path and selectively energized in accordance with the shutter speed and the f-number; the former of which is determined in accordance with the intensity of light from an object, the set film sensitivity, and a preset f-number; and the latter of which is determined in accordance with the intensity of the light, the set film sensitivity and a preset shutter speed. A viewfinder frame member limiting the range of field of view includes indicating holes equal in number to the indicating elements and a scale indicating window provided outwardly of the indicating holes, so that light from any one of the indicating elements is directed, by a transparent light guide member by which the light is reflected, towards a corresponding indicating hole. An f-number scale and a shutter speed scale are provided on a single indicating plate disposed below the light guide member. The indicating member is adapted to be shifted, by a shifting mechanism operable in association with the switching operation, to a first position in which only one scale is in the viewfinder optical path and assumes a position below the scale indicating window by means of the light guide member; and to a second position in which the aforesaid one scale moves further into the viewfinder optical path until it is concealed under the reflecting surface of the light guide member; and in turn the other scale assumes a position below the scale indicating window through the light guide member. Thus, only the viewfinder light which has illuminated the scale positioned below the scale indicating window reaches the scale indicating window through the light guide member. Conversely, the viewfinder light for illuminating the other scale positioned under the reflecting surface of the light guide member is blocked by the reflecting surface thereof, so that the light from only one of the indicating elements reaches a corresponding indicating hole. The operator can therefore see only one of the shutter speed scale or the f-number scale through the scale indicating window, when viewing the finder, and at the same time, see the bright indicating hole corresponding to the indicating element energized, in an area between the scale indicating window and the viewfinder image of an object.

With the arrangement described, only one scale shifted by the switching operation to a position below the scale indicating window provided in the finder frame member, with the light guide member interposed therebetween, can be seen within the finder view field, with the other scale maintained in a retracted position from the viewfinder optical path or concealed under the reflecting surface of the light guide member. Thus, the operator, when viewing the finder, can read the scale at a glance, without any confusion. The provision of both the shutter speed scale and the f-number scale on the same indicating member affords simplicity to the construction of the mechanism for shifting the indicating member in association with the switching operation, eliminating the necessity for fine adjustment of the positional relationship between the two scales after assembly. The use of only one indicating member having both scales enables one scale to remain in a retracted position from the viewfinder optical path in one switched position. However, in the other switched position, both scales are unavoidably moved into the viewfinder optical path. Arrangement is made in the latter case for the scale which has entered farther into the viewfinder optical path than the other scale to be sheltered by the reflecting surface of the light guide member, and due to the reflection by the reflecting surface of the light guide member light from one of the indicating elements disposed out of the viewfinder optical path is oriented to a corresponding indicating hole positioned inwardly of the scale indicating window, so that the corresponding indicating hole is always seen clearly in the area between the scale indicating window and the range of the viewfinder. By the clearly recognizable indicating hole, the operator can read the value indicated without averting his eyes from the viewfinder image of an object. In the embodiment shown, instead of a meter pointer, optical indicating elements are provided on a support plate, thus providing a mechanism that is highly resistant to vibration.

In another embodiment of the present invention, there is provided a single indicating plate having thereon a shutter speed scale and an f-number scale mounted in mutual parallel relationship. A mechanism shifts the indicating plate, in association with the switching operation, to a first position in which only one scale moves into the viewfinder optical path and assumes a given position, and to a second position in which the aforesaid one scale moves farther into the viewfinder optical path, and in turn, the other scale assumes that given position. A light shielding plate shields light from the aforesaid one scale displaced from the given position further into the viewfinder optical path, when the indicating plate is shifted to the second position. The light shielding plate includes thereon a group of indicating elements aligned in a row.

Also in this embodiment, either one of the shutter speed scale or f-number scale which has been shifted to a given position by the switching operation can be seen within the finder view field, with the other scale maintained in a retracted position from the viewfinder optical path or shielded by the light shielding plate. Thus, a similar result is provided as in the first embodiment.

In both embodiments, the indicating plate shifting mechanism is preferably interconnected to a member for selecting an exposure control mode, so that the switching between the two exposure modes and the switching between the two scales are accomplished simultaneously.

The above and other objects and features of the present invention will become more apparent from the following description taken in connection with the accompanying drawings.

BRIEF DESCRIPTION OF THE DRAWINGS

FIGS. 3A and 3B are cross-sectional views of the indicating device, showing its different operational conditions;

FIG. 4 is an enlarged perspective view of a part of the indicating device, showing a transparent light guide and the arrangement of light emitting diodes;

DESCRIPTION OF PREFERRED EMBODIMENTS

FIGS. 1 through 7 show a first embodiment of the present invention for a T.T.L. light-measuring, single lens reflex camera, wherein two exposure modes such as a shutter-speed-priority, automatic diaphragm control mode and a diaphragm-priority, automatic shutter speed control mode are alternatively selected.

Figure 1:
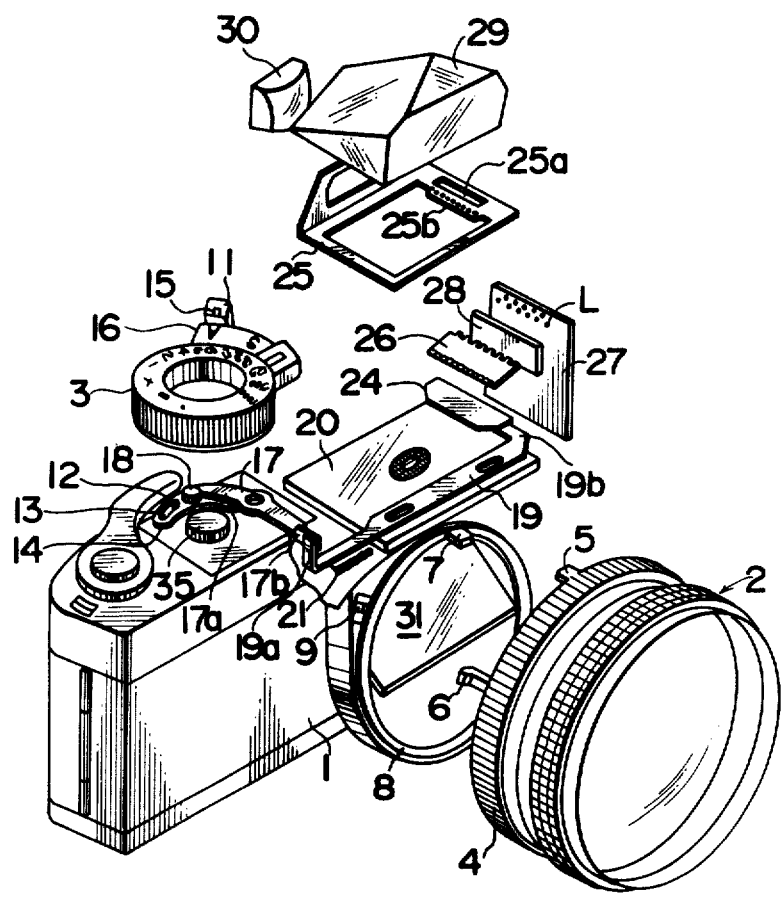
FIG. 1 is an exploded perspective view of a single lens reflex camera employing an indicating device according to a first embodiment of the present invention.

FIG. 1 schematically shows a T.T.L. light-measuring, single lens reflex camera equipped with a viewfinder indicating device according to a first embodiment of the present invention.

Exchangeable lens 2 is removably mountable to camera body 1. Shutter speed setting dial 3 is provided on camera body 1, and diaphragm setting ring 4 is fitted over exchangeable lens 2. Exchangeable lens 2 includes pawl 5 integral with diaphragm setting ring 4, and pawl 6 fixed at a point inherent to the exchangeable lens. Secured to camera body 1 are rotatable ring 8 having pawl 7, and an arcuate sliding plate (not shown) having pawl 9. Pawl 5 is adapted to engage pawl 7 of rotatable ring 8, to thereby rotate the ring in accordance with the number of steps from a minimum f-number to a preset f-number. Pawl 6 engages pawl 9, so that the arcuate sliding plate (not shown) is rotated in accordance with the number of steps from the maximum f-number (for example F16) of exchangeable lens 2 to a reference maximum f-number (for example F32) of exchangeable lens 2. Rotatable ring 8 and the arcuate sliding plate are interconnected with potentiometers (described hereinafter), so that the resistance values of the potentiometers are set in accordance with the degree of rotation of these members.

Exposure mode switching lever 11 is integral with rotatable plate 14 which is adapted to be urged under the guidance of a pin 12 and a slot 13 below shutter speed dial 3. Exposure mode switching lever 11 is shifted to a diaphragm-priority, automatic shutter speed control position (hereinafter referred to as a shutter speed EE position) in which indicia 15 is aligned with character S on character plate 16 fixed to camera body 1, and to a shutter-speed-priority, automatic diaphragm control position (hereinafter referred to as a diaphragm EE position) in which indicia 15 aligns with character A on the plate. Interlocking lever 17 for changing over from one scale to the other is adapted to actuate a switch included in an exposure control circuit (not shown) and switches in an indicating circuit which will be described later, so as to enable either diaphragm EE control or shutter speed EE control. Interlocking lever 17 is in engagement at one arm end 17a with pin 18 on rotatable plate 14, and is turned with the rotation of rotatable plate 14. When exposure mode switching lever 11 is set to the diaphragm EE position, interlocking lever 17 is positioned as shown in FIG. 1, and when exposure mode switching lever 11 is set to the shutter speed EE position, interlocking lever 17 is turned clockwise from the position shown in FIG. 1 by a given amount.

Elongated sliding plate 19 selectively locates a scale at a predetermined position in which the scale may be seen within the finder view field in response to the rotation of interlocking lever 17. Sliding plate 19 is slidably mounted on focusing plate 20 along the front edge portion thereof and is normally biased by spring 21 such that upright projection 19a engages the other arm portion 17b of interlocking lever 17. Fixed on the other arm portion 19b of sliding plate 19 is transparent indicating plate 24 having thereon parallelly spaced shutter speed scale 22 and f-number scale 23. Indicating plate 24 is adapted to shift on focusing plate 20 integrally with sliding plate 19. Viewfinder frame 25 defines a viewfinder optical path and is fixed above focusing plate 20 and provided with scale indicating window 25a and a group of indicating holes 25b. The group of indicating holes 25b are positioned inwardly of scale indicating window 25a.

Light guide member 26 is made of a transparent plastic material and is fixed between viewfinder frame 25 and indicating plate 24 to direct light to a corresponding indicating hole 25b from a plurality of light-emitting diodes L1 through L11 placed in two rows in staggered relation on support plate 27 provided out of the viewfinder optical path. Light guide member 26, as best seen in FIG. 4, has light incident portion 26a consisting of a series of wedge-shaped portions with alternating upward and downward slopes corresponding to the position of the indicating elements; a light reflecting surface 26b; and a series of light-emitting convex surfaces 26c. The light from any of light-emitting diodes L1 through L11 enters a corresponding wedge-shaped light incident portion 26a to be refracted thereby, and then is reflected by reflecting surface 26b, and collected through a corresponding light emitting convex surface 26c into one of indicating holes 25b. The relationship among light guide member 26, indicating plate 24 and viewfinder frame 25 will be more fully described hereinafter. When exposure mode switching lever 11 assumes the diaphragm EE position shown in FIG. 1, f-number scale 23 is positioned, through light guide member 26, below scale indicating window 25a provided in viewfinder frame 25, with shutter speed scale 22 assuming a retracted position from the viewfinder optical path, as clearly seen in FIG. 3B. When exposure mode switching lever 11 is set to the shutter speed EE position, then shutter speed scale 22 is positioned, through light guide member 26, below scale indicating window 25a with f-number scale 23 concealed under the reflecting surface 26b of light guide member 26, as clearly seen in FIG. 3A. A series of light-emitting convex surfaces 26c and reflecting surface 26b of light guide member 26 are located under the plurality of indicating holes 25b of viewfinder frame 25.

Transparent plate 28 is bright from any angle of the viewfinder for any of indicating holes 25b at which the light from any of light-emitting diodes has passed. Transparent plate 28 is disposed between support plate 27 and light guide member 26 and formed with fine light deflectors such as microprisms on one surface thereof. Pentaprism 29, eye-piece lens 30, and movable mirror 31, constitute a known viewfinder optical system, together with focusing plate 20. The light emitting diodes may be replaced by liquid crystal or lamps.

Figure 5:
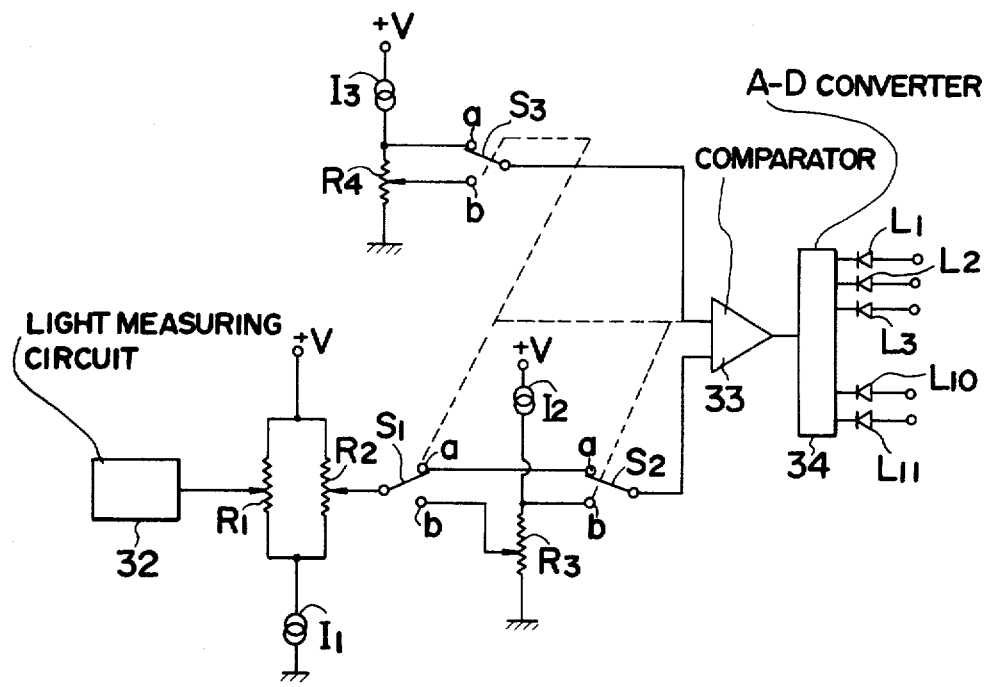
FIG. 5 is a schematic diagram of an indicating circuit employed in the indicating device.

FIG. 5 is a schematic diagram of an indicating circuit incorporated in the previously described embodiment. This indicating circuit is arranged to indicate a shutter speed and an aperture value (f-number), respectively, based on the following two equations:

$$Tv = Bv + Sv - Av \quad\quad (1)$$
$$= (Bv - Avo) + Sv - (Av - Avo)$$
$$= Bvo + Sv - P$$

$$Av = Bv + Sv - Tv \quad\quad (2)$$
$$= (Bv - Avo) + Sv - Tv + Avo$$
$$= Bvo + Sv - Tv - (Pc - Avc)$$

The expressions in the above equations are based on the APEX notation, wherein Tv is the time value representative of shutter speed, Bv is the luminance value, Sv is the film sensitivity, and Av is an aperture value representative of an f-number. Referring to notations particularly introduced in these equations, Avo and Avc are the respective APEX notations for the minimum f-number and the maximum f-number of the exchangeable lens used, and Bvo is representative of the APEX notation of the intensity of light passing through the objective lens of the exchangeable lens and through the fully opened diaphragm aperture. The following equation may be established:

$$P = Av - Avo; \quad Pc = Avc - Avo$$

Referring to the indicating circuit for performing the computation of the equations (1) and (2), in conjunction with FIG. 5, light measuring circuitry 32 produces a voltage level commensurate to the aforesaid Bvo in the APEX notation. Potentiometer R1 is adjusted in accordance with the set value of film sensitivity, namely Sv in the APEX notation, and potentiometer R2 adds in the number of steps from the minimum f-number to a preset f-number, namely P. These potentiometers are connected in parallel and connected in series to a constant current source I1. The sliding element of potentiometer R1 is connected to the output terminal of light measuring circuit 32, and a voltage commensurate to (Bvo+Sv) is provided at the positive terminal of this potentiometer. The sliding element of potentiometer R2 is provided on rotatable ring 8 and connected to switch S1, to which switch is supplied a voltage commensurate to $Bvo+Sv-P$.

Switch S1, together with other switches S2, S3, are closed and opened by interlocking lever 17. When exposure mode switching lever 11 is set to the shutter speed EE position, these switches contact respective terminals a, and when lever 11 is set to the diaphragm EE position, these switches contact the other respective terminals b. Potentiometer R3 is connected in series to constant current source I2 and adds the number of steps from the maximum f-number of the exchangeable lens used to the reference maximum f-number thereof. The sliding element of potentiometer R3 is provided on the arcuate sliding plate (not shown) and connected to terminal b of switch S1. The positive terminal of potentiometer R3 is connected to terminal b of switch S2, at which is provided a voltage commensurate to $Bvo+Sv-(Pc-Avc)$, when diaphragm setting ring 4 is assumed set to the maximum f-number.

Potentiometer R4 is connected in series to constant current source I3 to add a value to a preset shutter speed, namely, Tv in the APEX notation. The resistance of potentiometer R4 is set according to that position at which shutter speed dial 3 is set. To the sliding element and the positive terminal of potentiometer R4 are connected terminals a and b of switch S3, respectively. Comparator 33 generates an output commensurate to the difference in voltage between the stationary contacts of switch S2 and at switch S3. A-D converter 34 provides analog to digital conversion of the output from comparator 33. The plurality of light-emitting diodes L1 through L11 are connected to the output terminals of A-D converter 34 to emit light selectively according to the digital signal from the converter.

The indicating circuit is arranged to be energized at the initial stage of the depressing stroke of the shutter release button 35, or stated otherwise, at a stage before the stopping-down operation starts.

The following is a description of the indication of an f-number in the shutter-speed-priority, automatic diaphragm control mode. First, exposure mode switching lever 11 is set to the diaphragm EE position. Consequently, locking lever 17 operates, thereby enabling exposure control in the selected mode, as well as causing switches S1, S2 and S3 to contact their respective terminals b. Sliding plate 19 assumes the position shown in FIG. 3B, so that f-number scale 23 will be positioned, through light guide member 26, below scale indicating window 25a in viewfinder frame 25, with shutter speed scale 22 maintained in a retracted position from the viewfinder optical path. Finder light illuminating f-number scale 23 reaches scale indicating window 25a through light guide member 26, whereby f-number scale 23 is seen through scale indicating window 25a.

However, if exchangeable lens 2 is mounted on camera body 1, pawl 6 engages pawl 9, thereby rotating the arcuate sliding plate (not shown) by an amount commensurate with the number of steps from the maximum f-number of the exchangeable lens to the reference maximum f-number thereof, whereby the resistance of potentiometer R3 is determined. In order to realize the f-number indication in this mode, diaphragm setting ring 4 must be set to the maximum f-number beforehand. Thus, pawl 5 engages pawl 7, thereby rotating rotatable ring 8 by an amount commensurate with the number of steps from the minimum f-number of exchangeable lens 2 to the maximum f-number thereof, such that the resistance of potentiometer R2 is determined.

Following the above-described operation, shutter speed setting dial 3 is operated to select a desired shutter speed, thereby setting the resistance value of potentiometer R4. When the release button 35 is depressed to some extent, the indicating circuit shown in FIG. 5 is energized, so that a voltage commensurate with $Bvo+Sv-Pc$ appears at terminal b of switch S1, and a voltage commensurate with $Bvo\pm Sv+Avo$ appears at terminal b of switch S2. Since a voltage commensurate to Tv appears at terminal b of switch S3, then comparator 33 generates an output commensurate with Av expressed by equation (2). The comparator output is converted by A-D converter 34 into a digital signal, and in response to the digital signal thus obtained, one of light emitting diodes L1 through L11 is caused to emit light.

The light from that light-emitting diode enters a corresponding wedge-shaped light incident portion 26a of light guide member 26 via transparent plate 28 to be refracted thereby, then is reflected by reflected surface 26b, and emitted from the corresponding light-emitting convex portion 26c on the top of the reflecting surface. The light thus emitted is directed to a corresponding indicating hole 25b by the action of the light emitting portion. Thus, the operator viewing the finder sees the corresponding indicating hole 25b illuminated to indicate one of the f-numbers on f-number scale 23 appearing in scale indicating window 25b provided adjacent the holes. It is for the following reasons that the information of the number of steps from the maximum f-number of exchangeable lens 2 to the reference maximum f-number thereof is added by potentiometer R3. For the APEX notation of an f-number, the information of the minimum f-number is required (see equation (2)). Although the information of the number of steps from the minimum f-number to the maximum f-number is added to potentiometer R2, such a maximum f-number is dependent on the exchangeable lens used, and therefore the information of the number of steps cannot be the sole basis for providing the minimum f-number. A reference maximum f-number is therefore selected properly, and the information of the number of steps from the selected reference maximum f-number to the maximum f-number of exchangealbe lens 2 used is provided. These two sets of information are added. For example, a reference maximum f-number is selected as F32. If the number of steps from the selected reference maximum f-number to the maximum f-number of exchangeable lens 2 is 2, and the number of steps from the maximum f-number of exchangeable lens 2 to the minimum f-number is 5, then the minimum f-number of exchangeable lens 2 used will be a value corresponding to seven steps, counting from the reference f-number F32, namely, F 2.8. This method provides the same result as if the minimum f-number of the exchangeable lens used were directly given.

The following is a description of shutter speed indication in the diaphragm-priority, automatic shutter speed control mode. Exposure mode switching lever 11 is set to the shutter speed EE position. Then, interlocking lever 17 is engaged at its arm portion 17a by pin 18 on rotatable plate 14, to rotate clockwise from the position in FIG. 1 by a given amount. The clockwise rotation of interlocking lever 17 enables exposure control in this mode as well as to cause switches S1, S2 and S3 to contact their respective terminals a as seen in FIG. 5.

All that is necessary for a shutter speed indication is to add the information of the number of steps from the preset f-number to the minimum f-number, as is obvious from equation (1). Potentiometer R3 is disconnected from the indicating circuit as a result of switches S1 and S2 being on contact terminals a. The clockwise rotation of interlocking lever 11 also causes sliding plate 19 to slide to the position shown in FIG. 3A against the force of spring 21, whereby shutter speed scale 22 is positioned, through light guide member 26, below scale indicating window 25a in viewfinder frame 25, with f-number scale 23 hidden under the reflecting surface 26b of light guide member 26. Consequently, only the finder light which has illuminated shutter speed scale 22 through light guide member 26 reaches scale indicating window 25a, while the finder light for illuminating f-number scale 23 is blocked by reflecting surface 26b, and hence does not reach any of indicating holes 25b and scale indicating window 25a. Thus, the operator viewing the finder can see only the illuminated shutter speed scale 22 through scale indicating window 25a.

Subsequently, diaphragm setting ring 4 on exchangeable lens 2 mounted on camera body 1 is operated to select a desired f-number, thereby determining a resistance value of potentiometer R2. If release button 35 is depressed to some extent, then the indicating circuit in FIG. 5 is energized, thereby providing a voltage commensurate to Bvo+Sv−P via terminal a of switch S1 at terminal a of switch S2. However, terminal a of switch S3 is provided a normally constant reference voltage, and comparator 33 generates an output commensurate to Tv expressed by equation (1). The output is converted by A-D converter 34 into a digital signal, whereby one of light-emitting diodes L1 through L11 emits light in response to the digital signal.

Figure 6:
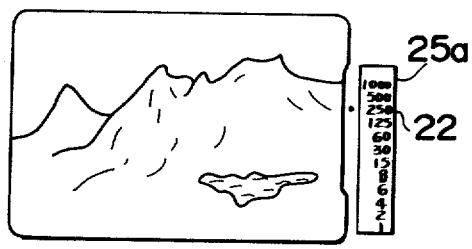
FIG. 6 is a view of the finder view field when the camera is set to the automatic shutter speed control mode and one of the light emitting diodes corresponding to a shutter speed 1/250 second is lit.

The light from the light-emitting diode is introduced by means of light guide member 26 into a corresponding indicating hole 25b in viewfinder frame 25, in the manner described above. Thus, the operator viewing the finder can see one indicating hole 25b illuminated to indicate one of the shutter speeds inscribed on shutter speed scale 22 appearing through scale indicating window 25a. FIG. 6 illustrates an exemplary state of the finder view field at that time.

Besides the f-number indication in the shutter-speed-priority, automatic diaphragm control mode and the shutter speed indication in the diaphragm-priority, automatic shutter speed control mode which have been described above, this embodiment also provides the following feature.

Figure 7:
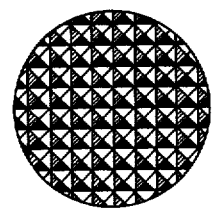
FIG. 7 is an enlarged view of the appearance of a window illuminated by light from the corresponding one of the light emitting diodes.

FIG. 7 shows, in enlargement, the condition of one illuminated indicating hole 25b. The portions colored with black correspond to cross sections of light flux from one of the light-emitting diodes which may reach an operator's eyes when he views the finder from a certain angle. If the angle of view of the operator is changed, the flux of light represented by the hatched cross sections will be seen. This is due to the fact that a large number of microprisms are provided on transparent plate 28 and act to divide the flux of light from the light-emitting diode to be deflected by a small angle in four directions. If the human eye were sufficiently high in resolving power, only part of indicating hole 25b could be seen illuminated in the manner shown in FIG. 7. However, since, as a matter of fact, each microprism is extremely fine as compared with the resolving power of the human eye, the indicating hole in its entirety is seen bright. With this arrangement, even with a change in the angle of view of the operator, there is no likelihood of the failure of light from the light-emitting diode to reach the operator's eyes. The operator thus can accurately discriminate from the other indicating holes one indicating hole 25b corresponding to the light-emitting diode which is emitting light.

In this embodiment, the light-emitting diodes in the upper row and those in the lower row are spaced apart a distance m from each other, and the neighboring light-emitting diodes in the same row are spaced apart by a distance l from each other, as clearly seen in FIG. 4. The placement of the light-emitting diodes in this way provides an increased distance l between the neighboring light-emitting diodes in the same row within the confined space, as compared with the case where the same number of light-emitting diodes are placed in one row. Light guide member 26 is formed with a plurality of wedge-shaped light incident portions 26a with alternating upward and downward slopes, in opposing relation to the light-emitting diodes placed in that fashion, so that due to the refraction of these wedge-shaped light-incident portions, the light from the light-emitting diodes in the upper row and the light from the light-emitting diodes in the lower row are both projected horizontally within light guide member 26, then enter reflecting surface 26b mutually at an equi-angle of incidence, and positively reach a corresponding indicating hole 25b. However, if, for example, the light from light-emitting diode L2 should enter the wedge-shaped light incident portion opposing light emitting diode L1, the light from that light-emitting diode would be oriented to the upper right or left portion by the refraction in that wedge-shaped light incident portion, whereby that light would not reach the indicating hole corresponding to the light-emitting diode L1. An increased spacing between the neighboring light-emitting diodes in the same row eliminates the risk that the light from light-emitting diode L3 located in the neighborhood of light-emitting diode L1 reaches an indicating hole corresponding to the light-emitting diode L1. With this arrangement, the operator can always see only one indicating hole illuminated, which corresponds to the light-emitting diode emitting light, when the finder is viewed from any angle, and thus, accuracy in the indication of a desired value by the indicating hole is provided.

Figure 8:
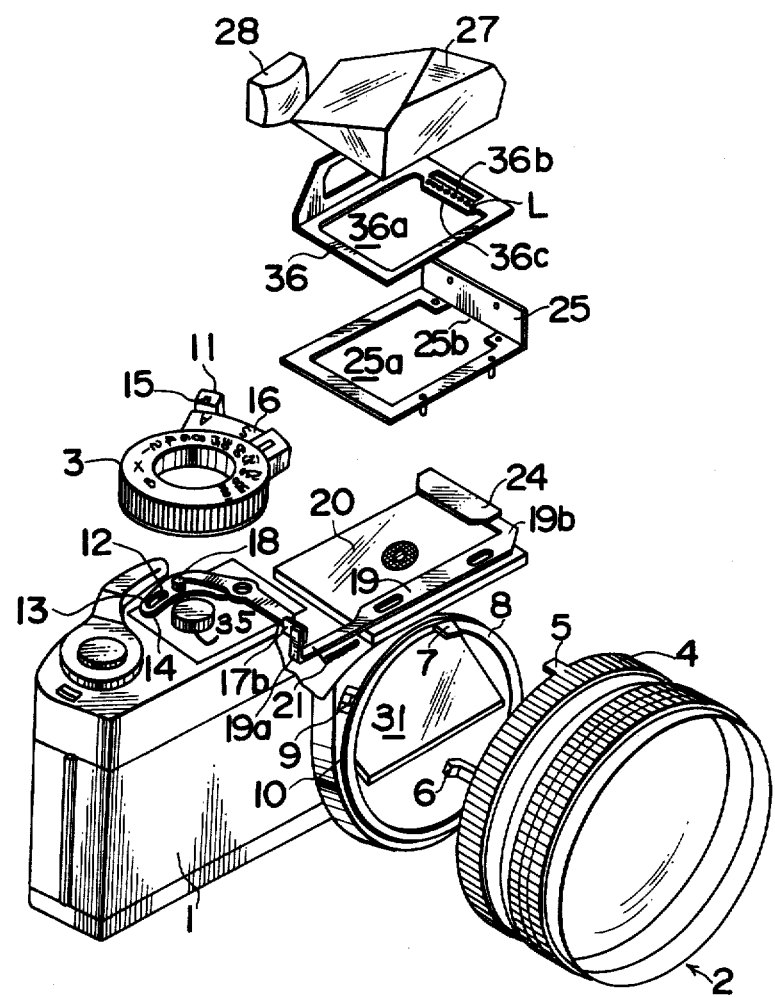
FIG. 8 is an exploded perspective view of a single lens reflex camera employing an indicating device according to a second embodiment of the present invention.
Figure 9A:
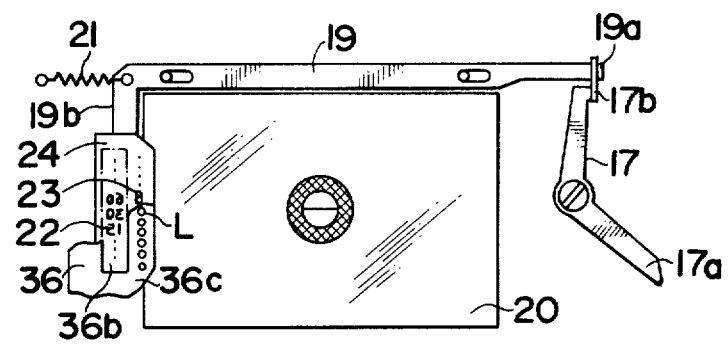
FIGS. 9A and 9B are plan views of the indicating device of FIG. 8, showing its different operational conditions.
Figure 9B:
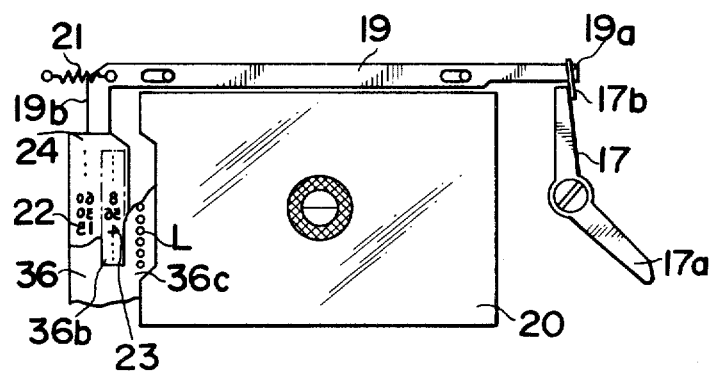

FIGS. 8, 9A and 9B illustrate another embodiment of the present invention wherein a group of indicating elements L are placed on light shielding frame 36 which is disposed in superposed relation on viewfinder frame 25, and in turn, light guide member 26, transparent block 28 and support plate 27 are omitted. Light shielding frame 36 has openings 36a and 36b, which are registered with opening 25a and cutout 25b provided in viewfinder frame 25, respectively. Between openings 36a and 36b is interposed bridge 36c on which are disposed the group of light-emitting diodes L. Referring to the relationship among the positions to which scale indicating plate 24 is shifted, cutout 25b in viewfinder frame 25 and opening 36b in light shielding frame 36, when exposure mode switching lever 11 assumes the diaphragm EE position shown in FIG. 8, f-number scale appears below cutout 25b and opening 36b. When exposure mode switching lever 11 is set to the shutter speed EE position, shutter speed scale 22 appears below cutout 25b and opening 36b, with f-number scale 23 hidden under bridge 36c of light shielding frame 36. Bridge 36c also serves as a means for shielding f-number scale 23 from light, and must have a width larger than that of f-number scale 23. The electric circuit incorporated in this embodiment is the same as that shown in the preceding embodiment, and hence no description thereof is necessary.

The following is a description of the f-number indication in the shutter-speed-priority, automatic, diaphragm control mode. Exposure mode switching lever 11 is first set to the diaphragm EE position. The resultant movement of interlocking lever 17 enables exposure control in this mode as well as turning switches S1, S2 and S3 into contact with their respective terminals b. Sliding plate 19 assumes the position shown in FIG. 9B, so that f-number scale 23 appears below opening 36b in light shielding frame 36 and cutout 25b in viewfinder frame 25, with shutter speed scale 22 hidden under light shielding frame 36.

When exchangeable lens 2 is mounted on camera body 1, pawl 6 engages pawl 9, thereby rotating the arcuate sliding plate (not shown) by an amount commensurate with the number of steps from the maximum f-number of the exchangeable lens used to a reference maximum f-number, whereby the resistance value of potentiometer R3 is determined. For the f-number indication in this mode, diaphragm setting ring 4 is set to the maximum f-number beforehand. Consequently, pawl 5 engages pawl 7, whereby rotatable ring 8 is rotated by an amount commensurate with the number of steps from the minimum f-number of the exchangeable lens used to the maximum f-number, thereby determining the resistance value of potentiometer R2.

Following the above-described operation, shutter speed setting dial 3 is turned to select a desired shutter speed, thereby setting the resistance value of potentiometer R4. Depression of release button 35 to some extent energizes the indicating circuit in FIG. 5, whereby a voltage commensurate to Bvo+Sv−PC is provided at terminal b of switch S1, and a voltage commensurate to Bvo+Sv+Avo is provided at terminal b of switch S2. A voltage is provided at terminal b of switch S3 commensurate to Tv, as a result of which comparator 33 generates an output commensurate to Av as expressed by equation (2). The output is converted by A-D converter 34 into a digital signal. According to the digital signal, one of light-emitting diodes L emits light, thus indicating that f-number providing a proper exposure.

Figure 2:
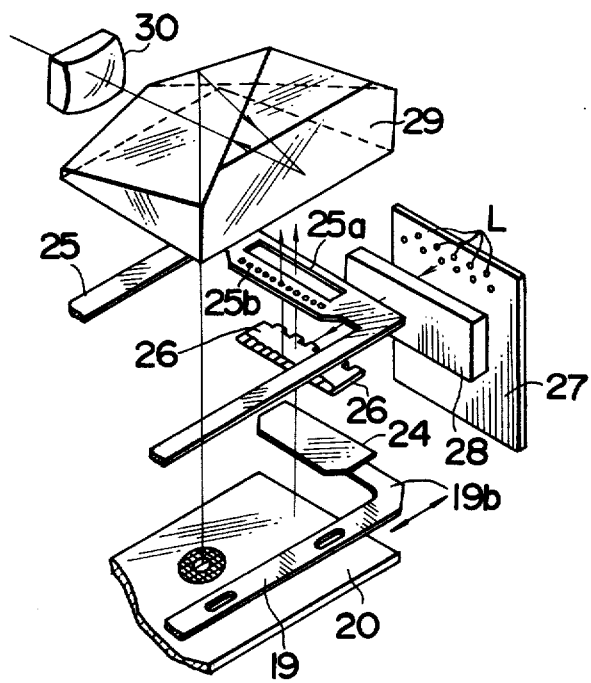
FIG. 2 is an exploded view of the indicating device of FIG. 1, in more detail.
Figure 3A:
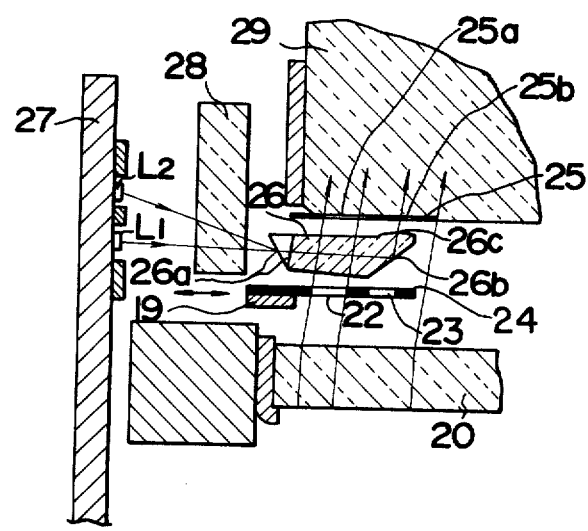

The following is a description of the shutter speed indication in the diaphragm-priority, automatic shutter speed control mode. Exposure mode switching lever 11 is set to the shutter speed EE position. Interlocking lever 17 is thereby rotated by its arm portion 17a engaging pin 18 on rotatable plate 14 by a given amount clockwise from the position shown in FIG. 8. The clockwise rotation of interlocking lever 17 enables exposure control in this mode, as well as turning switches S1, S2, S3 into contact with their respective terminals a, as shown in FIG. 2. All that is necessary for indication of the shutter speed is to add in the information of the number of steps from the minimum f-number to a preset f-number, as is apparent from equation (1), and potentiometer R3 is disconnected from the circuit as a result of switches S1 and S2 being turned to their respective terminals a. The clockwise rotation of interlocking lever 17 causes sliding plate 19 to slide to the position shown in FIG. 3A against the force of spring 20, whereby shutter speed scale 22 appears below opening 36b in light shielding frame 36 and cutout 25b appears in viewfinder frame 25, with f-number scale 23 hidden under bridge 36c of light shielding frame 36 (FIG. 9A).

In this case, only shutter speed scale 22 is seen, together with a respective one of light-emitting diodes L, in the viewfinder.

Following the above-described operation, diaphragm setting ring 4 on exchangeable lens 2 mounted on camera body 1 is turned to select a desired f-number, to set the resistance value of potentiometer R2. When release button 35 is depressed to some extent, the indicating circuit shown in FIG. 5 is energized, whereby a voltage commensurate to Bvo+Sv−P is fed through terminal a of switch S1 to terminal a of switch S2. However, a constant voltage is provided at terminal a of switch S3, and comparator 33 generates an output commensurate to Tv as expressed by equation (1). The output is converted by A-D converter 34 into a digital signal, and according to the digital signal, one of a plurality of light-emitting diodes L is caused to emit light, thus indicating that shutter speed providing a proper exposure.

What is claimed is:

1. An indicating device for a camera which includes a viewfinder and is selectively settable at least to an automatic diaphragm aperture control mode and to an automatic shutter speed control mode, comprising:

a frame defining the viewfinder optical path and including an opaque bridge arranged within said viewfinder optical path to divide the viewfinder field into an image viewing section and an indicating section, said bridge including a plurality of windows;

a plurality of optical indicating elements located outside of said viewfinder optical path and each associated with a respective window;

first indication signal generating means for generating an electric signal representative of an automatically controlled diaphragm aperture upon selection of the automatic diaphragm aperture control mode;

second indication signal generating means for generating an electric signal representative of an automatically controlled shutter speed upon selection of the automatic shutter speed control mode;

means for selectively energizing one of said optical indicating elements in accordance with the electric signals from the selected one of said first and second indication signal generating means;

a transparent light guide disposed below said frame and traversing said viewfinder optical path and including light reflecting means below said windows for reflecting the light from an energized one of said optical indicating elements towards the corresponding one of said windows;

a transparent scale plate disposed below said light guide and including f-number and shutter speed scales disposed in parallel relationship with one another;

a manually operable member; and means interconnecting said manually operable member with said scale plate for shifting said scale plate between a first position wherein only a predetermined one of said scales is at a predetermined position in said viewfinder optical path to be observed at the indicating section of the viewfinder field and a second position wherein both said scales are in said viewfinder optical path, said predetermined scale being below said light reflecting means with the other scale being at said predetermined position to be observed in the indicating section of the viewfinder field with said scale plate in the second position, and said light reflecting means being adapted to shield light coming through said predetermined scale with said scale plate in the second position.

2. An indicating device as in claim 1, further comprising manual selecting means for selecting one of the automatic diaphragm control mode and the automatic shutter speed control mode, and wherein said manual selecting means includes said manually operable member such that said manually operable member causes said interconnecting means to shift said scale plate between said first and second positions in accordance with the selection of the exposure control modes.

3. An indicating device as in claim 1, wherein said optical indicating elements are arranged in a staggered manner in respective first and second rows; and wherein said light guide includes first light incident surfaces to refract light from said optical indicating elements in said first row towards said light reflecting means and second light incident surfaces to refract light from said optical indicating elements in said second row towards said light reflecting means, said first and second light incident surfaces being alternatively arranged one by one and having respective inclinations such that the optical paths of the light refracted thereby towards said light reflecting means are substantially in a common plane.

4. An indicating device as in claim 3, further comprising a plurality of light converging elements arranged between said windows of said frame and said light reflecting means for respectively converging the light from one of said optical indicating elements on the corresponding one of said windows.

5. An indicating device as in claim 4, wherein said light guide includes said light converging elements.

6. An indicating device as in claim 5, wherein said light guide is made of a transparent synthetic resin.

7. An indicating device as in claim 1, further comprising a transparent plate having a number of fine light deflectors and disposed between said optical indicating elements and said light reflecting means, said light deflectors including regularly distributed light refracting surfaces for refracting the light from each of said optical indicating elements at a predetermined angle in at least two directions to facilitate observation of said windows which are illuminated by the lights from said optical indicating elements.

8. An indicating device as in claim 7, wherein said light deflectors are microprisms.

9. An indicating device as in claim 1, wherein said optical indicating elements are light emitting diodes.

10. An indicating device as in claim 1, wherein said optical indicating elements are liquid crystals.

* * * * *